US008363832B2

(12) United States Patent
Di Crescenzo et al.

(10) Patent No.: US 8,363,832 B2
(45) Date of Patent: Jan. 29, 2013

(54) VEHICLE SEGMENT CERTIFICATE MANAGEMENT USING SHARED CERTIFICATE SCHEMES

(75) Inventors: Giovanni Di Crescenzo, Madison, NJ (US); Stanley Pietrowicz, Freehold, NJ (US); Eric Van Den Berg, Hoboken, NJ (US); Robert G. White, Morristown, NJ (US); Tao Zhang, Fort Lee, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 915 days.

(21) Appl. No.: 12/051,241

(22) Filed: Mar. 19, 2008

(65) Prior Publication Data

US 2008/0232583 A1    Sep. 25, 2008

Related U.S. Application Data

(60) Provisional application No. 60/918,742, filed on Mar. 19, 2007.

(51) Int. Cl.
*H04L 29/06* (2006.01)

(52) U.S. Cl. .......................................... 380/44; 380/278
(58) Field of Classification Search .................... 380/44, 380/273, 278; 713/156
See application file for complete search history.

(56) References Cited

U.S. PATENT DOCUMENTS

| 5,600,324 A * | 2/1997 | Reed et al. ..................... 341/176 |
| 2002/0023223 A1* | 2/2002 | Schmidt et al. ................ 713/187 |
| 2002/0128769 A1* | 9/2002 | Der Ghazarian et al. ...... 701/207 |
| 2002/0152173 A1* | 10/2002 | Rudd ............................... 705/57 |
| 2005/0229006 A1 | 10/2005 | De Moura et al. |
| 2007/0222555 A1 | 9/2007 | Tengler et al. |
| 2007/0223702 A1 | 9/2007 | Tengler et al. |

OTHER PUBLICATIONS

International Search Report, dated Aug. 6, 2008 (2 pages).
Yoav Benjamini et al., "Controlling the False Discovery Rate: A Practical and Powerful Approach to Multiple Testing," Journal of the Royal Statistical Society, 1995, pp. 289-300, vol. 57, No. 1.
John D. Storey et al., "Strong Control, conservative point estimation and simultaneous conservative consistency of false discovery rates: a unified approach," Journal of the Royal Statistical Society, 2004, pp. 187-205, vol. 66, No. 1.

* cited by examiner

*Primary Examiner* — Ali Abyaneh
(74) *Attorney, Agent, or Firm* — Philip J. Feig

(57) ABSTRACT

The present invention advantageously provides techniques to solve problems with combinatorial anonymous certificate management by addressing critical issues concerning its feasibility, scalability, and performance. Methods and procedures to manage IEEE 1609.2 anonymous and identifying cryptographic keys and certificates in the Vehicle Infrastructure Integration (VII) system are presented, along with methods for management of identifying and anonymous certificates in a partitioned Certificate Authority architecture designed to enhance vehicle privacy. Novel methods for vehicles to dynamically change an anonymous certificate for use while maintaining vehicle privacy are given. Refinements to basic combinatorial schemes are presented including probabilistic key replacement, rekey counter decrement, dynamic rekey threshold, geographic attack isolation and proofs of geographic position.

16 Claims, 6 Drawing Sheets

VEHICLE SEGMENT CERTIFICATE MANAGEMENT USING SHARED CERTIFICATE SCHEMES

CROSS REFERENCE TO RELATED APPLICATION

The present invention claims the benefit of U.S. provisional patent application 60/918,742 filed Mar. 19, 2007, the entire contents and disclosure of which is incorporated herein by reference.

This application is related to commonly-owned, co-pending U.S. patent application Ser. No. 12/012,454 filed on Feb. 1, 2008, the entire contents and disclosure of which is expressly incorporated by reference as if fully set forth herein.

This application is related to the following commonly-owned, co-pending U.S. Patent Application filed on even date herewith, the entire contents and disclosure of which is expressly incorporated by reference as if fully set forth herein. U.S. patent application Ser. No. 12/051,309, for "VEHICLE SEGMENT CERTIFICATE MANAGEMENT USING SHORT-LIVED, UNLINKED CERTIFICATE SCHEMES".

FIELD OF THE INVENTION

The present invention relates generally to vehicle segment certificate management. In particular, the invention relates to the anonymous cryptographic key and certificate management process.

BACKGROUND OF THE INVENTION

Defining a method for managing 1609.2 Certificate Signing Request (CSR) or other anonymous certificates for the Vehicle Infrastructure Integration (VII) system is a very difficult, complex, and multi-faceted technical challenge. No method proposed to date has completely satisfied all design goals. Each offers a different balance of competing and intricately interrelated objectives, which include vehicle privacy, system security, system scalability, system robustness, vehicle segment maintenance, low complexity, practical implementation and ubiquitous operation.

Various categories of approaches for the management of anonymous keys and certificates are known. One such category includes combinatorial certificate schemes that are shared-key approaches where each vehicle uses a small number of keys and certificates that are drawn randomly from a shared pool of keys and certificates. The keys in the pool can be created by a key-generation algorithm. Privacy is achieved because each key and certificate is shared by many vehicles. However, the balance among scalability, privacy, and performance in this category is limited.

Another category is a short-lived, unlinked certificate scheme in which each vehicle is assigned a large number of unique keys. Privacy is achieved because each vehicle can use one out of a large number of certificates at any time.

The basic combinatorial anonymous certificate schemes, or basic combinatorial: schemes, achieve privacy by distributing the same public-private key pair and its associated certificate to a sufficiently large number of vehicles. Thus, any activity related to a particular key and certificate cannot be traced to a single vehicle because the number of vehicles potentially originating such activity is very large. A short description is presented of the basic combinatorial scheme organized into the following three phases: key generation, key distribution, and key revocation and update.

Key Generation: The Certificate Authority (CA) creates a pool of N uniformly and independently distributed triples, each triple containing a public key, a secret private key, and an associated certificate.

Key Distribution: Every vehicle will be given a small number (n) of keys, and their associated certificates chosen randomly and independently from the pool.

Key Revocation and Replacement: Keys and certificates could be used in malicious activities. Once a certificate is detected to be involved in malicious activities, the CA will revoke the certificate. The CA can revoke a certificate by posting it on a public certificate revocation list (CRL) which will be distributed to all vehicles and other entities that need to communicate with vehicles and therefore will need to verify 1609.2 certificates. Any communication signed using a revoked key will be disregarded.

When a certificate C is revoked, each vehicle that shares C will eventually request from the CA a new key pair and its certificate to replace the revoked certificate. The CA uses the number of rekey requests from each vehicle to determine whether a vehicle is a suspect in malicious activities and whether the vehicle should continue to receive new anonymous keys and certificates. In particular, the CA will only give new anonymous keys and certificates to a vehicle that has not requested more than b keys, where b is referred to as the rekey threshold. When all anonymous certificates on a vehicle have been revoked and the vehicle is no longer allowed by the CA to receive new anonymous certificates, the vehicle will need to be taken to service stations for further investigation and to gain re-authorization before it is allowed to receive new certificates again.

The basic combinatorial schemes replace revoked certificates by revoking each misbehaving key k immediately upon detection and use the same new key k' to replace the revoked certificate k on every vehicle that requests a replacement certificate for k. In the alternative, the revoked certificates can be replaced by revoking $g>1$ certificates at a time. The CA creates g replacement keys (and their associated certificates) to replace the g revoked keys. Each vehicle requesting for rekey will be given a key randomly drawn with probability p from the set of newly created replacement keys and with probability $1-p$ from entire pool of N keys.

Techniques are known to associate the anonymous certificates assigned to a vehicle with vehicle-specific information (e.g., the VIN number) so that the on-board equipment (OBE) will not function when it is moved to a different vehicle.

The certificate revocation and replacement methods in the basic combinatorial schemes have limitations. For example, if the same certificate is used to replace a revoked key on all vehicles that have this revoked key, an attacker can repeat its malicious activity indefinitely without being caught as follows. First, a vehicle sends a maliciously prepared message using a given key k. The VII system detects this message and key k is revoked. At this point, it is hard to detect which vehicle generated the maliciously prepared message as several vehicles were assigned key k and thus any one of them could have potentially acted maliciously. Later, all vehicles that previously shared key k update this key and receive a new key k'. Now, the attacker continues its malicious activity using the new key k', thus forcing this new key to be revoked again. This loop might continue indefinitely without the VII system detecting which vehicle is acting maliciously.

In addition, the method in the basic combinatorial schemes for revoking $g>1$ certificates at a time and giving each requesting vehicle randomly selected certificates will result in unpredictable (uncontrollable) distributions of certificates among vehicles This means that the privacy, scalability, and performance of the certificate management system will become unknown and unmanageable over time.

The main operations in the anonymous certificate management process are 1) testing, 2) initialization, 3) selection and rotation, and 4) revocation and replacement of anonymous keys and certificates. Testing of anonymous keys and certificates can be performed by both vehicle suppliers and vehicle original equipment manufacturers (OEMs) to ensure the correct functioning of the key and certificate generation software and hardware components.

Initialization of anonymous keys and certificates involves the interaction between vehicles, vehicle dealers, and vehicle OEMs to allow vehicles to obtain their initial sets of live anonymous keys and certificates. Once a vehicle is initialized with its long-lasting keys and certificates, such as the 1609.2 CSR certificates, the vehicle can use these long-lasting keys and certificates to acquire initial anonymous keys and certificates in the same manner as it will acquire subsequent anonymous keys and certificates.

Selection and rotation of anonymous keys and certificates includes procedures used by each vehicle to select the anonymous keys and certificates to use and to decide how and when to rotate (change) the anonymous certificates each vehicle uses.

Revocation and replacement of anonymous keys and certificates determines which anonymous certificates should be revoked, revoking these certificates from the vehicles and the VII system, and providing new keys and certificates to replace the revoked keys and certificates on the vehicles. However, certificate revocation and replacement methods in the basic combinatorial certificate schemes have several crucial limitations that need to be overcome. First, they cannot support a moderate to high number of attackers. Second, they will result in unpredictable and uncontrollable probability distributions of certificates among vehicles, resulting in unpredictable and uncontrollable system scalability and performance. Third, they are missing some necessary methods to ensure the continuous operation of the certificate management system. For example, they use a fixed rekey threshold to determine which vehicles should no longer be allowed to receive new anonymous certificates, but do not provide a method for decrementing or resetting the rekey counters.

Hence, there is a need for a carefully designed anonymous certificate revocation and replacement process to ensure that the anonymous certificate management system can achieve proper balances among critical objectives such as scalability, privacy, and performance.

The following defined terms are used throughout.

Anonymous Certificate: A certificate associated with a public-private key pair that, when used by vehicles, will not enable the identification and tracking of vehicles. In a combinatorial certificate scheme, each anonymous certificate will be shared among many vehicles in the VII system. The certificate is attached to a signed message that is generated by a vehicle and is used to verify the digital signature.

Anonymous Key: A private-public key pair that is shared among many vehicles in the VII system and is used to sign messages. Anonymous private keys are highly confidential and any compromise of an anonymous key can threaten the integrity of the VII system.

Attacker: Any entity that may be using anonymous keys and certificates to harm, damage, or manipulate the VII system either maliciously or unintentionally.

Attacker Elimination: The process of removal or rendering an attacker harmless to the VII system. Examples of attacker elimination include proactive system measures, such as locking out a vehicle (i.e., completely revoking all anonymous certificates on a vehicle), and pushing an attacker out of the system by means of certificate expiration.

Certificate: An electronic form of credential that uses a digital signature of a trustworthy authority to attest to the binding of a public key with an identity and/or a set of permissions.

Lock-out: An action taken by the VII system to deny certificate requests, typically because of excessive rekey attempts.

Private Application: An optional value-add service selected by the vehicle owner or occupant that is delivered using the VII system.

Private Key: An encryption/decryption code mathematically related to a paired public key in an asymmetric cryptographic system. A private key is held in secret and is used to decrypt information encrypted by its paired public key or sign information as proof of authenticity or integrity.

Public Application: A mandatory service in the VII system, generally for public safety or improved mobility, that all vehicles participate in using anonymous messages.

Public Key: An encryption code mathematically related to a paired private key in an asymmetric cryptographic system. A public key is shared and used to encrypt information that can only be decrypted by its paired private key. It is computationally infeasible to derive a private key from a public key.

Vehicle Segment: The collection of hardware and software installed in each vehicle that supports VII functions.

BRIEF SUMMARY OF THE INVENTION

The present invention advantageously provides techniques to solve some of the problems with combinatorial anonymous certificate management by addressing the critical issues concerning its feasibility, scalability, and performance. Methods and procedures to manage IEEE 1609.2 anonymous and identifying cryptographic keys and certificates in the Vehicle Infrastructure Integration (VII) system are presented, along with methods for management of identifying and anonymous certificates in a partitioned Certificate Authority architecture designed to enhance vehicle privacy. Novel methods for vehicles to judiciously select an anonymous certificate for use and to dynamically change it to improve vehicle privacy are given. The operation and mathematical underpinning of each technique and the anonymous certificate selection methods are described.

The inventive method for management of cryptographic keys and certificates for a plurality of vehicles comprises steps of generating a pool of triples using a key-generation algorithm, the pool having key-pool-size number of triples; distributing to and associating with each vehicle of the plurality of vehicles a small number of triples chosen randomly from the pool of triples; revoking a triple of the chosen triples when the triple is detected as used in malicious activity; and for each vehicle associated with the revoked triple, determining whether to replace the revoked triple using one or more refinements.

The refinements can include a probabilistic key replacement technique comprising steps of revoking number-c triples that are randomly chosen among the triples of the pool that are not currently revoked, where the number-c is a small integer; selecting number-c1 new triples randomly and independently generated using the key-generation algorithm, where the number-c1 is the number-c plus one; designating the number-c1 new triples to replace the revoked number-c triples; and when a vehicle requests an updated triple, choosing the updated triple among the number-c1 new triples and sending the chosen updated triple to the requesting vehicle.

A second refinement can be a rekey counter decrement technique comprising steps for each vehicle of creating an anonymous identifier and maintaining a rekeying record associated with the anonymous identifier; incrementing a rekey counter in the rekeying record for the anonymous identifier according to a number of keys the vehicle requests over a time period; and decrementing the rekey counter for each anonymous identifier by an amount if no rekey requests occurred during a previous time period, unless the rekey counter equals one of a rekey threshold and zero, wherein when the rekey counter is less than or equal to the rekey threshold for the vehicle, replacing the one revoked triple for the vehicle.

A third refinement can be a dynamic rekey threshold technique comprising steps for each vehicle of creating an anonymous identifier and maintaining a rekeying record associated with the anonymous identifier; if the vehicle is associated with the revoked triple, adding a mark against the vehicle; choosing a threshold based on the mark, the small number of triples associated with the vehicle, and the key-pool-size; and if the mark is less than the threshold, replacing the revoked triple.

A fourth refinement can be a geographic attack isolation technique comprising steps of compiling a list of vehicles to which the revoked triple was distributed; and for each vehicle on the list of vehicles, if the vehicle has given proof of being in a geographically different position from an RSE that recorded the revoked triple, removing the vehicle from the list, and replacing the revoked triple.

A fifth refinement can be a proofs of geographic position technique comprising steps of compiling a list of vehicles to which the revoked triple was distributed; for each vehicle on the list of vehicles, requesting a proof of position from an RSE, and if the proof of position illustrates the vehicle is in a geographically different position from an RSE that recorded the revoked triple, removing the vehicle from the list, and replacing the revoked triple.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
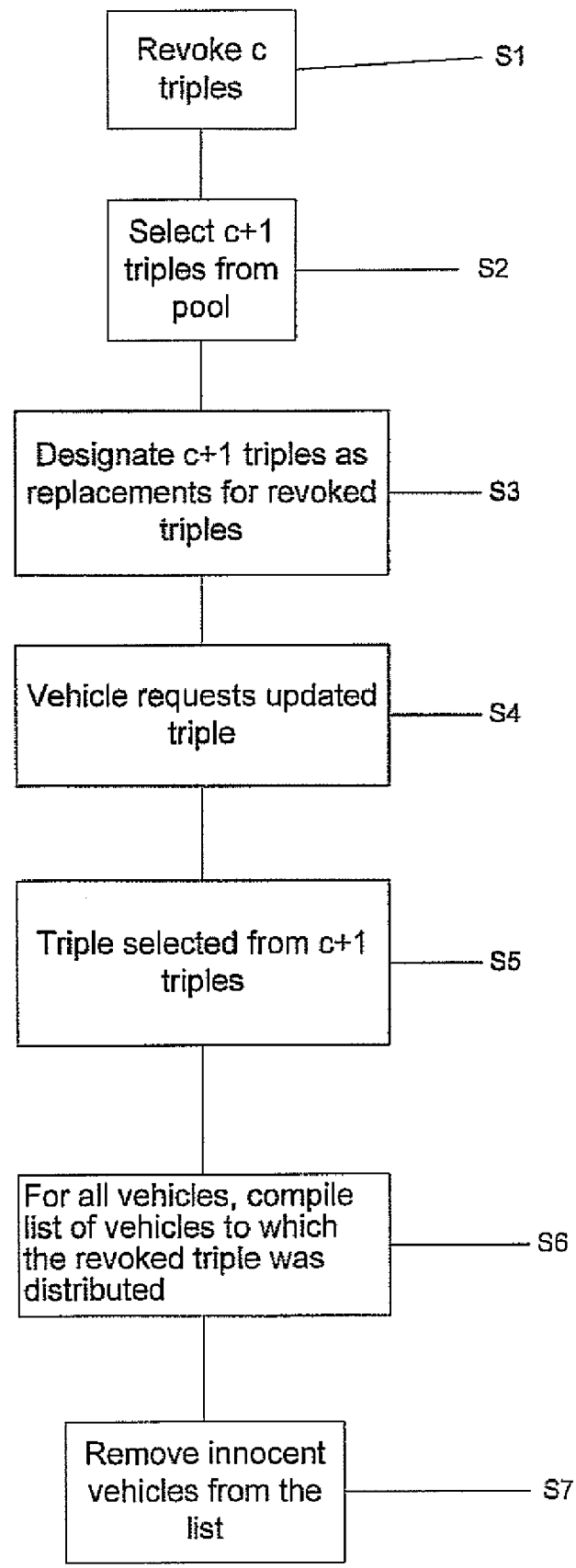
FIG. 1 is a flowchart of a first embodiment.

Combinatorial certificate schemes or basic combinatorial schemes include shared-key approaches where each vehicle uses a small number of keys and certificates that are drawn randomly from a shared pool of triples, or keys and certificates. Privacy is achieved because each key and certificate is shared by many vehicles. Inventive embodiments enabling combinatorial certificate schemes to handle significantly higher number of attackers while maintaining high privacy and low impact on innocent vehicles are provided. These embodiments can be implemented individually or in various combinations to enhance the basic combinatorial scheme.

Probabilistic Key Replacement

The goal of this embodiment is to achieve two properties simultaneously: preventing repeated malicious activity from continuing indefinitely without detection, and maintaining the probability distribution of certificates among vehicles over time. This anonymous certificate revocation and replacement strategy enables the detection of repeatedly malicious vehicles, maintains the same probability distribution of the anonymous certificates on vehicles, and only incurs a small extra overhead.

This embodiment is an intelligent rekey strategy designed to overcome two critical limitations of basic combinatorial certificate schemes. The embodiment can be implemented as a refinement to a basic combinatorial scheme. First, this new rekey strategy allows the CA to probabilistically isolate an attacker quickly as the rekey process continues by implicitly placing an attacker among a different group of innocent vehicles on each round of rekeying, thus forcing the attacker to have the greatest commonality among the sets of vehicles that rekeyed. Second, it maintains the uniform distribution of the anonymous certificates among all vehicles, which helps ensure that the certificate management system has predictable (hence controllable) performance over time as vehicles join and leave the system.

According to this strategy, whenever a triple or key k is revoked, the CA will also choose to revoke a number, e.g. "number-c" or c, additional triples or keys $k(1), \ldots, k(c)$, that are randomly chosen among the keys that are in the current version of the pool and that are not currently revoked, for some small integer $c >= 1$ (here, choosing a small c is only relevant with respect to performance evaluation). Furthermore, the CA selects c+1 new keys $k', k'(1), \ldots k'(c)$ randomly and independently generated using the key-generation algorithm, and designates these keys to replace the revoked keys in the scheme structure. Later, upon receiving a vehicle's request to update either key k or one of the additional c revoked keys k(i), the CA will update any of these keys by using the following probabilistic modification with respect to the previous strategy.

The CA randomly and independently chooses one among the new keys $k', k'(1), \ldots k'(c)$ and sends this chosen key as the new key to the vehicle that requested it. Two main properties of this key-update procedure, discussed below, are attained; neither of these properties is achieved by basic combinatorial certificate schemes.

The first property is that the stationary distribution of keys among vehicles is maintained. More precisely, the above strategy maintains the following invariants: 1) at any time, the pool of keys contains N keys that are randomly and independently chosen according to the associated key-generation algorithm. 2) every vehicle is given and associated with n keys uniformly and independently distributed from the set of keys that are in the current (updated) version of the N-sized key pool. These and other related invariants maintained by the above strategy are of crucial importance to preserve the analysis of the various performance metrics associated with the certificate scheme even after multiple revocations of keys, and thus throughout the lifetime of the scheme.

The second property of this key-revocation strategy is that it helps in quickly discovering which vehicle is responsible for repeatedly malicious behavior or malicious activity, as discussed below.

Attacker Elimination by a Linked-Key Test

It is assumed that malicious activity from a vehicle comes in the form of one or more particular messages, each signed using one particular key pair, and it is further assumed that this malicious activity is detectable. Hence, given a particular message sent by a vehicle, there is a procedure that establishes whether it contains malicious activity. A procedure to discover all the attackers that sent messages containing malicious activity can be performed as follows.

First, for any triple or key that is associated with a message containing malicious activity, a list of candidate attackers is recorded. This list contains the list of vehicles to which this triple was distributed. To reduce this list, all vehicles that have updated this revoked triple and have given proof of being in a position geographically different from the geographic area of the RoadSide Equipment (RSE) that recorded the message with malicious activity are removed from the list.

Alternatively, as shown in rekey counter and rekey threshold techniques below, a set of all sets of triples or keys distributed to the vehicles can be maintained. For each set of the number of revoked keys, a counter in the set can be updated. At any time, if there is a triple having a list with a single vehicle in it, or a single rekey counter updated, then this vehicle will be declared the only candidate for malicious activity with key k. For all remaining malicious-activity triples or keys, all lists associated with them are considered, and the number of occurrences of the vehicle identities in them are counted. That is, for each vehicle v, and at any time, $ml(v)$ is defined as equal to the number of lists to which this vehicle belongs at this time. Here, the number $ml(v)$ denotes the "malicious level" of this particular vehicle. Three cases can be distinguished:

If there is one vehicle such that $ml(v)>2n$, this vehicle is a "strong candidate for repeated malicious activity".

If there is one vehicle such that $n<=ml(v)<2n$, this vehicle is a "candidate for repeated malicious activity".

If there is one vehicle such that $2<ml(v)<n$, this vehicle is a "weak candidate for repeated malicious activity".

Note that the threshold parameter above set equal to $2n$ may have to be changed according to varying concrete settings of parameters n, N, and V.

FIG. 1 is a flowchart illustrating probabilistic key replacement. Initially, basic combinatorial scheme processes are performed (not shown) so that a vehicle obtains a small number of triples chosen randomly from a pool of triples, and when malicious activity is detected, the triple associated with the malicious activity is revoked, and it becomes necessary to determine whether to replace the revoked triple for a particular vehicle. In step S1 of this key replacement, c triples are revoked; these triples are randomly chosen among the triples of the pool that are not currently revoked. In step S2, c+1 new triples, randomly and independently generated, are selected. The new c+1 triples are designated to replace the revoked c triples in step S3. A vehicle requests an updated triple in step S4, and, in step S5, a triple is chosen from among the c+1 triples and sent to the requesting vehicle.

Optionally, the following additional steps can be performed. For each revoked triple, a list of vehicles to which the revoked triple was distributed can be compiled in step S6, and all innocent vehicles, that is vehicles that have updated the revoked triple and have given proof of being in a geographically different position from an RSE that recorded the revoked triple, can be removed from the list in step S7.

Rekey Counter Decrement

An essential and effective approach to detect whether a vehicle may be misusing its anonymous certificates is to keep track of and analyze how many times the vehicle has requested new certificates during given time periods. The ways in which such rekey counters are maintained for the vehicles are essential to the scalability of the anonymous certificate schemes and the impact on innocent vehicles. This embodiment is an intelligent way to dynamically decrement the vehicle rekey counters depending on the vehicles' rekeying activities in order to significantly reduce the cumulative negative impact of certificate revocation on innocent vehicles. The embodiment can be implemented as a refinement to a basic combinatorial scheme.

This embodiment significantly reduces the number of locked-out innocent vehicles and improves vehicle lifetime, i.e., the time before a vehicle is locked out, and therefore enables the basic combinatorial schemes to handle a significantly higher number of attackers while maintaining the same levels of privacy and impact on innocent vehicles. A properly designed rekey counter decrement strategy is also necessary to allow the combinatorial certificate schemes to continue to function over time because without a properly designed rekey counter decrement method, the rekey counters will grow indefinitely and eventually make these rekey counters unusable.

In this embodiment, no inherent assumptions are made regarding either the number of attackers, or the number of certificates they use in their attacks. It can be combined with any of the other embodiments. The assumption is made that the Assigning CA maintains a record of each set of public-private key pairs and their associated certificates. A description of how this embodiment would be implemented follows.

When a vehicle is initialized, the Assigning CA creates an anonymous identifier (AID). The Assigning CA selects n>0 anonymous public-private key pairs and their associated certificates, i.e. triples, and securely sends these to the vehicle. The Assigning CA keeps a rekeying record with a rekey counter (RC) associated with each anonymous identifier. The Assigning CA increments the associated rekey counter for each vehicle according to the number of keys the vehicle requests over a specified period of time. No re-key requests will be granted to vehicles when their RC exceeds the Rekey Threshold (RT).

The Assigning CA decrements the RC for each AID by a specified amount if there have been no rekey requests during the previous time period. If the RC equals the RT, then the Assigning CA does not decrement the RC. Once a vehicle has reached its RT limit, it is effectively locked-out until it has undergone an inspection and been authorized to receive additional keys. The Assigning CA will not decrement the RC lower than zero (0) regardless of how long the vehicle has had no rekey requests. This keeps the RC associated with each AID between 0 and the RT value.

The method improves the vehicle lifetime by decrementing a vehicle's RC if there were no rekey requests in the previous time period. In contrast, the basic combinatorial scheme allows the RC to grow over time causing vehicles to be locked-out at a faster rate. However, the effectiveness of this embodiment to increase vehicle lifetime relative to the basic combinatorial scheme declines as the number of attackers increases. This is because a larger number of attackers will cover a larger fraction of innocent vehicles than would fewer attackers.

Motivation for the Method

An attacker will cause its keys to be revoked. Every key that is revoked will also be held by innocent vehicles. However, very few innocent vehicles share more than one or two keys with a particular attacker. This means that if there are fewer attackers, the attackers will all be locked out before the innocent vehicles that share some of their keys. Over time, the cumulative effect of attackers will cause innocent vehicles to be locked-out. An innocent vehicle may have only one key revoked every two months due to attacker activity, but this means that after two years, the vehicle will be locked out if the RT is less than twelve.

The current refinement reduces the RC of vehicles for which there have been no rekey requests during a time period. An innocent vehicle could go several months before having a key revoked by attacker activity. These vehicles will have their RCs reduced so that when they do experience key revocation due to attacker activity they are better able to sustain the effect without being locked out. Other options for implementing a decrement are possible, e.g., decreasing the counter by a fixed amount per time unit (corresponding to the expected revocations per time unit for an innocent vehicle). The potential benefit of a more elaborate decrement algorithm is an area that could be further studied.

Expected Vehicle Lifetime

Let N (key-pool-size) be the number of anonymous triples or keys in the pool; let n be the number of anonymous certificates held by each vehicle at one time; and set b to be the rekey threshold, RT.

Consider a vehicle that has just been introduced to the system with its RC set to zero. We compute the expected number of time periods before the vehicle is locked-out if there are m attackers per period.

The probability distribution function for the RC of the vehicle in period t is computed recursively as follows.

Let $S(k,t)$ be the probability that the vehicle's RC equals k in period t.

The vehicle was introduced with a rekey counter set to 0 so that $S(0,0)=1$ and $S(k,0)=0$ if $k>0$.

For $t=1$ and $0 \leq k \leq b$ we have $S(k,1)=P(k)$ where we define $P(k)=B(k,m,n/N)$, the Binomial probability of k occurrences in m trials with probability n/N.

For $t>1$ we have:

$$S(0,t)=S(0,t-1)P(0)+S(1,t-1)P(0).$$

For $0<k<b-1$ we have:

$$S(k, t) = S(k+1, t-1)P(0) + \sum_{i=0}^{k-1} S(i, t-1)P(k-i)$$

For $k=b-1$ we have:

$$S(b-1, t) = \sum_{i=0}^{b-1} S(i, t-1)P(b-1-i)$$

For $k=b$ we have:

$$S(b, t) = 1 - \sum_{i=0}^{b-1} S(i, t)$$

$S(b,t)-S(b,t-1)$ is the probability density function of the vehicle lifetime so the mean value of the distribution is given by $$\sum_{t=1}^{\infty} t(S(b, t) - S(b, t-1))$$

Figure 2:
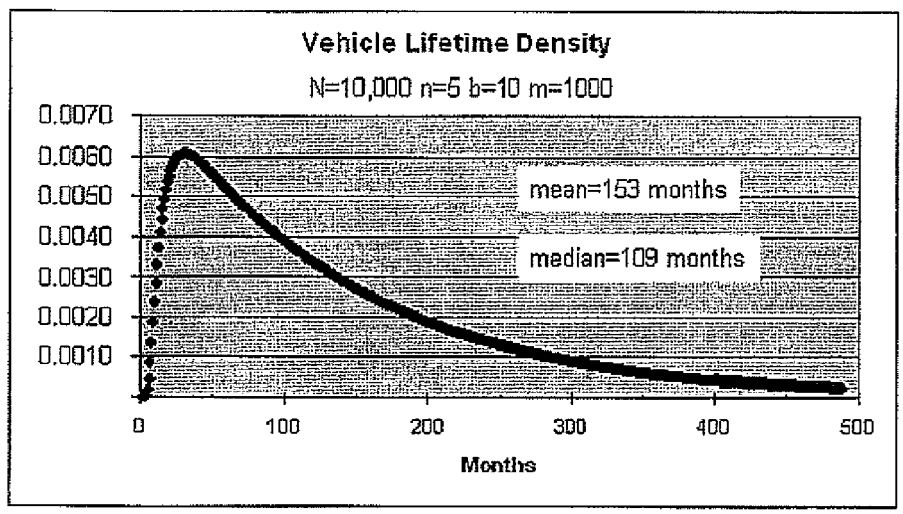
FIG. 2 illustrates vehicle lifetime density.

If we take the time interval to be months, then FIG. 2 shows the vehicle lifetime density for m=1,000, b=10, n=5, and N=10,000.

In this case, our method yields an expected vehicle lifetime of 153 months. By contrast, in the basic combinatorial scheme, the expected vehicle lifetime with these same parameters is just six months, so that our method significantly improves vehicle lifetime.

Figure 3:
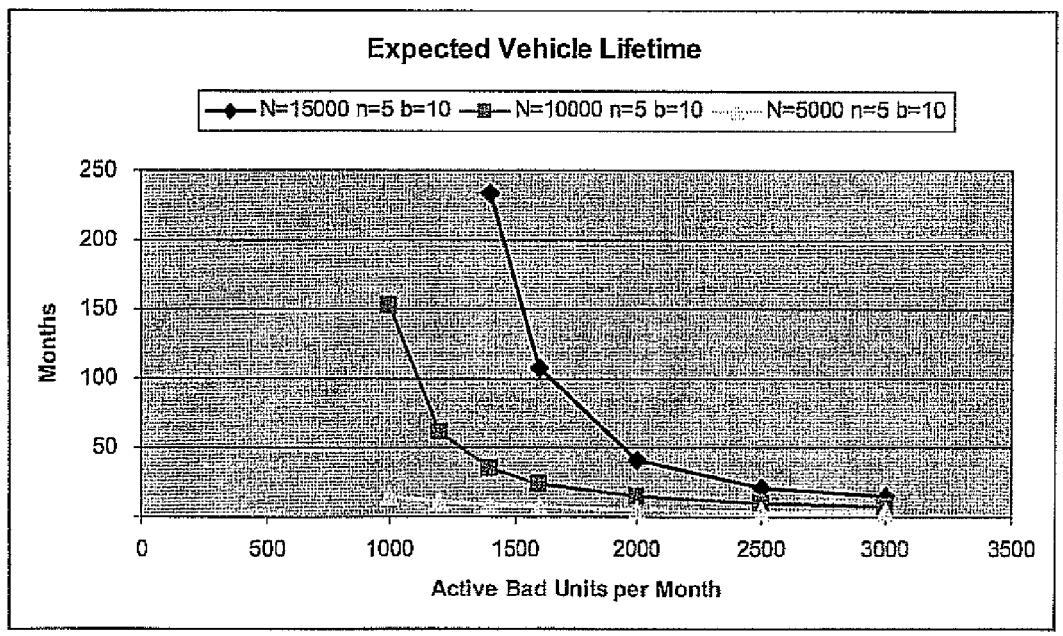
FIG. 3 illustrates expected vehicle lifetime.

FIG. 3 shows the expected vehicle lifetime as a function of m, the number of attackers per time period. In this case, the time period is one month.

Note that the method is most effective if the number of attackers is less. For a larger number of monthly attackers, the method may be extended by increasing the RT. This allows attackers to receive more keys but minimizes the impact from locking-out innocent vehicles.

Large-Scale Attack Analysis

In a large-scale attack that is based on the keys from many compromised vehicles, an intrusion detection capability associated with the Assigning CA can compute the required RT that is needed to maintain a prescribed level of innocent vehicle lockout. This will limit the collateral damage from the attack and allow the system to continue to function at near normal levels. The penalty is that the number of vehicles that are operating as attackers in the system may take longer to remove.

It should be noted that a misbehaving unit that is not a vehicle will be eliminated immediately as it misuses its keys. For example, such units could be laptop computers that have been programmed to use anonymous keys. The rekey process requires the vehicle to have an Identifying key so that vehicle-imposters would not be able to be rekeyed.

In the large-scale attack case, the RC decrement per period may need to be made larger so that the system can more quickly return to normal after the attack. In fact the rekey time period could be shortened in combination with increased RT and RC decrement to respond to events on the ground while managing through the crisis.

Figure 4:
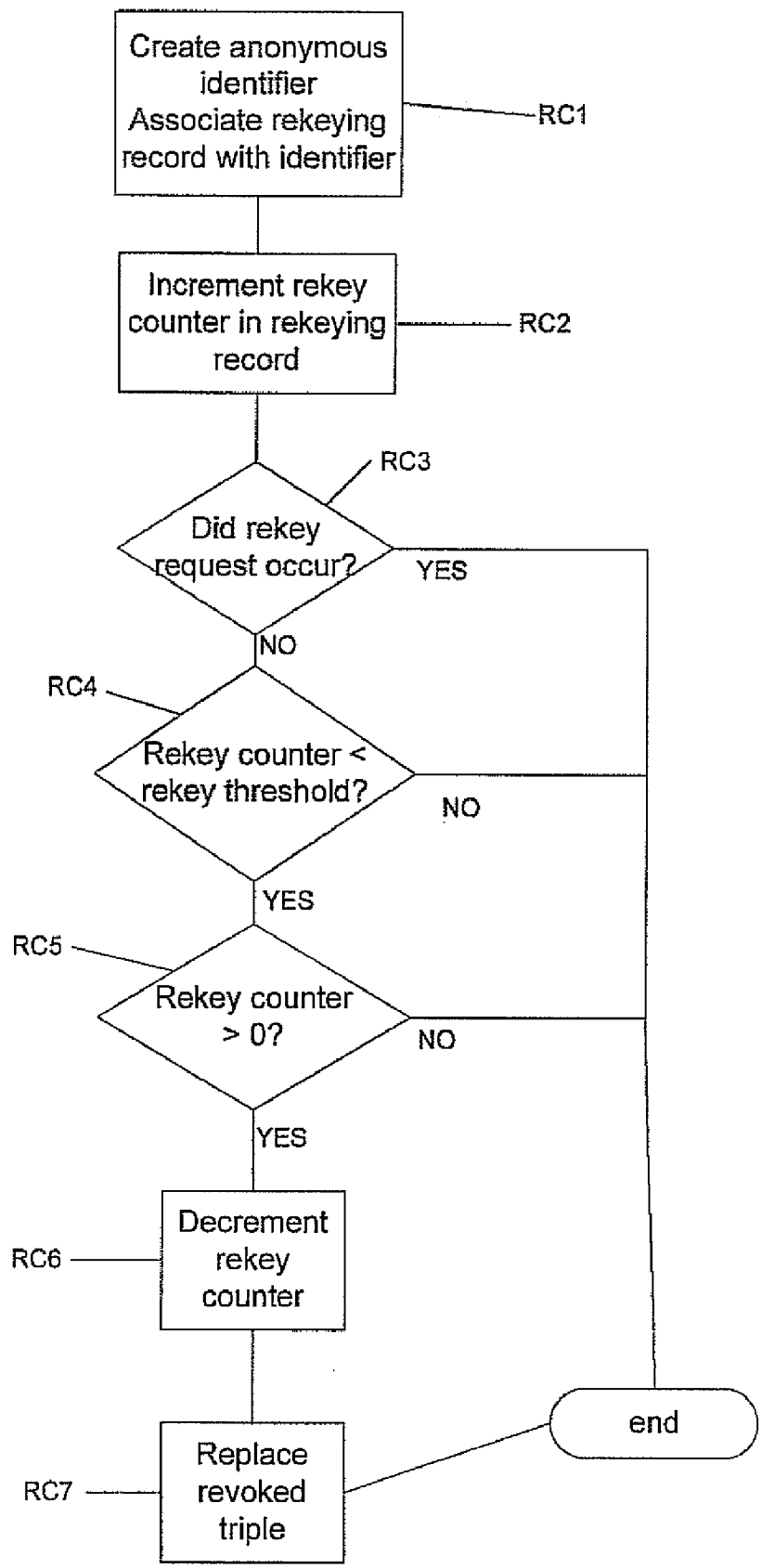
FIG. 4 is a flowchart of a second embodiment.

FIG. 4 is a flowchart illustrating rekey counter decrement. Initially, basic combinatorial scheme processes are performed as described above. In step RC1, an anonymous identifier is created for each vehicle, and a rekeying record is associated with this anonymous identifier. In step RC2, a rekey counter in the rekeying record is incremented according to a number of keys the vehicle requests over a time period. A check is performed in step RC3 to determine if rekey requests occurred during a previous time period. If no rekey request occurred (RC3=NO), the rekey counter value is compared to a rekey threshold in step RC4. If the rekey counter is less than the rekey threshold (RC4=YES), the rekey counter is compared to zero in step RC5. If the rekey counter is greater than zero (RC5=YES), the rekey counter is decremented by an amount in step RC6. In step RC7, the revoked triple for the vehicle is replaced and the process is terminated.

If the rekey counter equals the rekey threshold (RC4=NO) or the rekey counter is zero (RC5=NO), the rekey counter is not decremented and the process is terminated.

Dynamic Rekey Threshold

This embodiment uses a mathematical model to eliminate attackers anonymously and provides a novel approach that enables the VII system to control the number of innocent vehicles that may be incorrectly accused of malicious activity. These goals are achieved by dynamically setting and adjusting the rekey threshold based on target performance criteria, e.g., false attacker elimination ratio, and total number of the misused certificates for the vehicle population. The method tracks the number of misused certificates for each vehicle in an anonymous manner by taking advantage of the fact that the set of n certificates held by a vehicle is a relatively unique vehicle pseudonym or "anonymous ID."

After one or more certificates have been detected to be involved in malicious activities, the CA needs to revoke these certificates. Furthermore, the CA needs to know which vehicles are involved in malicious activities so that it will stop giving anonymous certificates to these vehicles to prevent attackers from attacking the VII system indefinitely. However, the CA should allow innocent vehicles that happen to share anonymous certificates with attackers to continue to receive new anonymous certificates to replace their revoked certificates.

The basic combinatorial scheme uses a fixed rekey threshold, b, to decide which vehicles are attackers and hence should no longer be allocated anonymous certificates. As discussed above, the CA tracks the number of rekey requests from each vehicle using its rekey counter RC. Once the RC for a vehicle exceeds the fixed rekey threshold (RT) b, the vehicle is believed to be an attacker (i.e., misusing its anonymous certificates) and will no longer be allowed to receive new anonymous certificates.

This basic scheme has at least the following critical limitations. One, it will lock-out an excessively large number of innocent vehicles even for relatively small number of attackers, which will make the VII public application cease to function and will also create excessive workload at service stations that will need to examine these "locked-out" vehicles and re-authorize them for receiving anonymous certificates again.

Two, the RCs will grow over time as new anonymous certificates are detected as being misused. Eventually, the RCs for all or most of the vehicles will be over the RT b. No method to dynamically decrement or reset the RCs over time exists. Three, it is difficult to determine a fixed RT value that is proper for a nationwide VII system over a long period of time.

Therefore, it is necessary to develop a method to dynamically set and adjust the RT. It should be set to meet critical certificate management goals, such as the level of scalability, level of privacy, and performance, e.g., the ratio of wrongly accused innocent vehicles. The RT should be adjusted to respond to the changing system environment, such as the number of detected attackers in the system, in order to significantly reduce the impact of attackers on innocent vehicles.

An embodiment is described that takes as input the detected misused certificates and dynamically sets and adjusts the RT to meet given system design criteria, and uses the dynamic RT to detect attackers in an anonymous manner, i.e., without identifying the vehicles. The embodiment can be implemented as a refinement to a basic combinatorial scheme. The same methods described in this embodiment can also be used for detecting misused certificates. Furthermore, the method is easily extended to the case where certificates or black marks are short-lived.

This section also analyzes the effectiveness of the proposed anonymous detection embodiment when there are two hundred million vehicles, v=200,000,000.

For the mathematical analysis in this section, we assume that misused certificates are detected immediately and without error. Each misused certificate is black-marked immediately upon detection. Black marking allows for delayed revocation of certificates, but immediate certificate revocation is an alternative. In addition, we assume the CA only needs to know the v sets of anonymous certificates that have been assigned to the vehicles at any time. The CA, however, does not know which certificates have been assigned to which vehicles. It is possible for the CA to count the number of certificates revoked within each certificate set (which represent a vehicle).

Intuitively, if the number of black-marked certificates for a vehicle is relatively high, it is likely to be a misbehaving vehicle. It is desirable to detect misbehaving vehicles as quickly as possible, without impacting too many innocent vehicles. Schemes for detecting misbehaving vehicles are presented below with performance analysis.

Detection Scheme 1: Threshold Scheme

Each time a certificate is detected as being misused, the CA puts a black mark against each vehicle that shares this certificate. An important observation is that statistically an attacker will have more black marks than an innocent vehicle, and that the black marks against an attacker will grow more quickly than the black marks for innocent vehicles.

The mathematical underpinning for this observation is as follows. For an innocent vehicle, the probability of having b black-marked certificates after a total of mt certificates have been black marked is, $$((1(1-n/N)^{mt})^b \approx (1-e^{-ct})^b$$

where $c=mn/N$.

For an attacker that has used exactly k black-marked certificates, this probability is higher: since misused certificates are detected and black-marked immediately, the probability of having b black-marked certificates after a total of mt certificates have been black-marked is $$((1-(1 \sim n/N)^{mt})^{b-k} \approx (1-e^{-ct})^{b-k}$$

Alternatively, with probability $((1-(1-n/N)^{mt})^b \approx (1-e^{-ct})^b$, an attacker which misuses k certificates has b+k black marks.

So indeed, an attacker is likely to have more black marks than an innocent vehicle. How many more depends on how many certificates it misuses.

Now suppose a vehicle has b black-marked certificates. How likely is it to have b or more black-marked certificates revoked if the vehicle is in fact innocent? Ignoring a possible maximum limit on the number of rekeying events per vehicle, this probability is $$p(b) = \sum_{k=b}^{\infty} (1-e^{-ct})^k = e^{ct}(1-e^{-ct})^b \qquad (1)$$

which is called the p-value of observing b revocations for a vehicle. This p-value decreases with b: the higher b, the less likely the vehicle is innocent.

A detection method for misbehaving vehicles can be devised as a threshold method, which is in fact a statistical hypothesis test. We are testing hypothesis $H_0$: the vehicle used all its certificates correctly, versus the general alternative $H_1$: the vehicle misused one or more of its certificates. A sufficient test statistic T is the number of certificates which have been black-marked for the vehicle under consideration. Our test is a threshold method (in fact, it is a generalized likelihood ratio test): accept $H_0$ if T<t, and reject it, i.e., a misbehaving vehicle is detected, if T≧t. A threshold $t_\alpha$ can be chosen so that the probability of falsely declaring a vehicle misbehaving is $\alpha$.

Suppose one vehicle is monitored. Choose $t_\alpha$ by solving: $p(t_\alpha)=\alpha$, or $$p(t_\alpha)=e^{ct}(1-e^{-ct})^{t_\alpha}=\alpha$$

$$t_\alpha=\log(e^{-ct}\alpha)/\log(1-e^{-ct})$$

Notice that $t_\alpha$ (mt, n, N, $\alpha$) depends on the parameters $\alpha$, mt, n and N. As more certificates are revoked (i.e. for higher mt), the threshold is higher.

For $\alpha$=0.05, mt=1000 n=5, N=10,000, and thus ct=0.5, we obtain the threshold $t_\alpha = \log(e^{-ct}\alpha)/\log(1-e^{-ct})$=3.75. To maintain a five percent probability of mistakenly labeling the vehicle as misbehaving, the misbehaving vehicle is flagged after it has four or more black-marked certificates.

When there are two hundred million vehicles (v=200,000,000), test v=200,000,000 hypotheses $H_{i0}$: vehicle i is innocent, i.e., used all its certificates correctly, versus the respective alternatives $H_{i1}$: vehicle i misused one or more of its certificates. Suppose that all but a relatively small number $m_1$ of the vehicles are innocent (that is, $m_0 = v - m_1$ null hypotheses $H_{i0}$ are true). Then on average $(v-m_1)\alpha$ false alarms will be raised, and (at most) $m_1$ true ones. The number of false alarms has in fact a Binomial$(v-m_1, \alpha)$ distribution. Therefore, the probability of at least one false alarm is $(1(1-\alpha)^{v-m_1})$. Moreover, the expected ratio of false alarms to total alarms is approximately $(v-m_1)\alpha/((v-m_1)\alpha+m_1)$, which is almost 1. Thus, almost all alarms raised will in fact be false alarms!

This example points out the need to exert multiplicity control. In one approach, we can dramatically reduce $\alpha$ so that the probability of having even one false alarm in monitoring v=200,000,000 vehicles is controlled at the original level $\alpha_{FWER}$=0.05. This way, the Family Wise Error Rate (FWER) is controlled at $\alpha_{FWER}$. For v=200,000,000, this leads to $\alpha = 2.5 \cdot 10^{-10}$(!). This is no longer practical; for example, for mt=1000 n=5,N=10,000, and thus ct=0.5, we obtain the threshold $t_\alpha = \log(e^{-ct}\alpha)/\log(1-e^{-ct})$=24.3. This would detect and label a vehicle misbehaving if it has 25 or more black marks. However, this conservative threshold leads to (too) many missed detections.

In the next section, an alternative approach to multiple testing, which achieves better balances between the number of false alarms and missed detections, is presented.

Detection Scheme 2: False Discovery Rate Control

In recent years, an alternative approach to multiple testing has become popular: instead of controlling the traditional Family Wise Error Rate as described above, a different control criterion is used. This criterion is the False Discovery Rate (FDR). The FDR is defined as follows. Suppose we are testing v null hypotheses $H_{i0}$, i=1, . . . , v as defined above. Then Table 1 gives an overview of the errors.

TABLE 1

Number of Errors Committed when Testing v Null Hypotheses

| Privacy & Confidentiality Threat Description | Declared non-Significant | Declared Significant | Total |
|---|---|---|---|
| True null hypotheses | U | V | $m_0 = v - m_1$ |
| Non-true null hypotheses | T | S | $m_1 = v - m_0$ |
| Total | v − R | R | v |

The FDR is the expected proportion of errors committed by falsely rejecting null hypotheses. In terms of the random variables listed in Table 1, the FDR can be mathematically defined as $FDR = E(V/V+S) = E(V/R)$ In *Controlling the False Discovery Rate: A Practical and Powerful Approach to Multiple Testing*, Journal of the Royal Statistical Society, Series B, Vol. 57, No. 1, pp. 289-300, 1995, Benjamini and Hochberg define a procedure (B-H procedure) for controlling the FDR below a specified level q*. They consider the test statistics for the v hypothesis tests $T_i$, i=1, . . . , v, and calculate their corresponding p-values $P_i = p(T_i)$ using the p-value calculation, (1), above. If the tests are ordered by the size of their p-values, $P_{(1)} \leq P_{(2)} \leq \ldots \leq P_{(v)}$, in increasing order, this ordering induces an equivalent ordering on the test-statistics in decreasing order: $T_{(1)} \geq T_{(2)} \geq \ldots \geq T_{(v)}$. Accordingly, the B-H procedure for controlling the FDR becomes:

Let k be the largest i for which $$P_{(i)} \leq \frac{i}{v} q^*;$$

Reject all $H_{0(i)}$, i=, . . . , k.

This procedure has been shown to guarantee that:

$$FDR = E(V/R) \leq \frac{m_0}{v} q^* \leq q^*$$

Note that the procedure does not incorporate the number of true null hypotheses $m_0$. If this is large, this makes little difference. But if knowledge (or an estimate) of $m_0$ (or $m_0/v$) is available, then the procedure can be made more powerful by replacing the original q* by $$\frac{v}{m_0} q^*$$

or its estimate. Then the procedure still guarantees controlling the FDR at level q*, while rejecting more false null hypotheses. Incorporating knowledge about $m_0/v$ is also at the basis of the increase of power in the FDR controlling method of B-H procedure.

The B-H procedure is known as a 'step-up' procedure. It is implemented by comparing $$P_{(i)} \leq \frac{i}{v} q^*,$$

starting with $P_{(v)}$ and continuing linearly towards $P_{(1)}$ until the algorithm stops. Since the method is sequential, the actual threshold at which to reject null hypotheses is a random variable, and therefore the method is an 'adaptive' or random threshold method.

In contrast, Storey J., Taylor J. E., and Siegmund D., *Strong Control, Conservative Point Estimation and Simultaneous Conservative Consistency of False Discovery Rates: a Unified Approach*, Journal of the Royal Statistical Society, Series B, Vol. 66, No. 1, pp. 187-205, 2004 consider an FDR-controlling procedure based on a fixed threshold $\alpha$ for p-values in order to reject null hypotheses. The procedure relies on a conservative estimate of the FDR corresponding to rejection with a fixed threshold $\alpha$, $FDR_{\delta T}(\alpha)$. Here $\delta$ is a tuning parameter, for which a selection/estimation algorithm is given. It is interesting to compare the fixed threshold FDR controlling method with the fixed threshold methods considered above. As the number of hypotheses v is large, the FDR is approximately $FDR = E(V/R) \sim E(V)/E(R)$ Let $\pi_0 = m_0/v$. The requirement of controlling the FDR at a specified level FDR≦q* then implies:

$$\alpha \leq \frac{(1-\pi_0)q^*}{\pi_0(1-q^*)}$$

For the parameters: number of misbehaving vehicles $m_1=1000$, $v=200,000,000$ and $q^*=0.5$ (one false alarm for every true alarm), we get a threshold of a $\alpha \leq 10^{-5}/(1-10^{-5}) \approx 10^{-5}$ for the p-values, which translates into a threshold of $t_{10^{-5}} = \log(e^{-ct}10^{-5})/\log(1-e^{-ct})$ for the test statistics. For mt=1000 n=5, N=10,000, and thus ct=0.5, we obtain the threshold $t_{10^{-5}} = 12.9$.

Note that given the total number of black marks mt, the number of misbehaving vehicles is upper bounded by mt, and lower bounded by $mt/t_\alpha$.

With about 1000 misbehaving vehicles, to obtain a ratio of one false detection for every true detection, we need to detect if the number of black-marked certificates for a vehicle is 13 or higher. This indeed strikes a balance between the single-test approach that detects about 4 vehicles, and the FWER-derived approach that detects about 25 vehicles.

Figure 5:
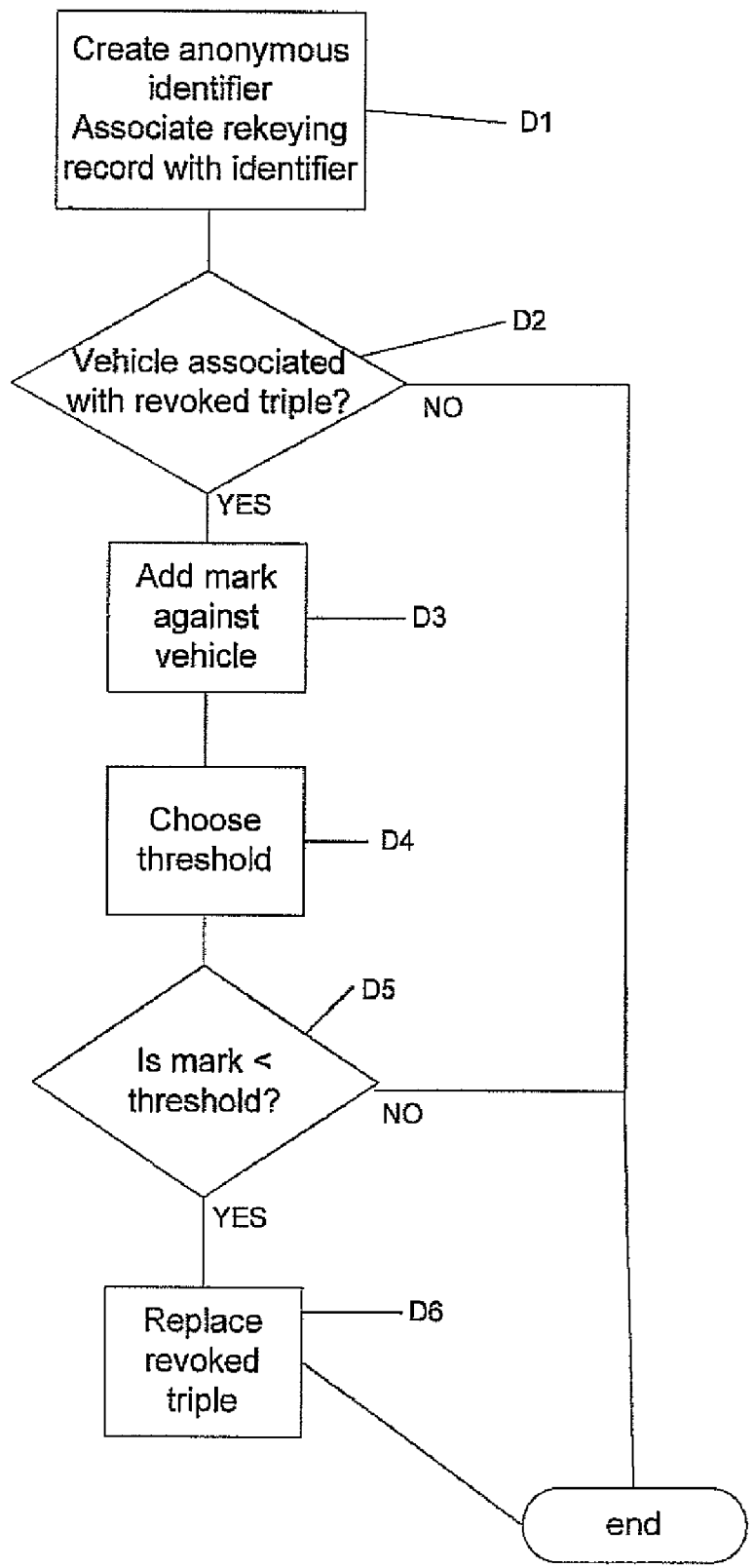
FIG. 5 is a flowchart of a third embodiment.

FIG. 5 is a flowchart illustrating dynamic rekey threshold. Initially, basic combinatorial scheme processes are performed as described above. For each vehicle, an anonymous identifier is created and a rekeying record associated with the anonymous identifier is maintained in step D1. If the vehicle is associated with a revoked triple (D2=YES), a mark against the vehicle is added in step D3. A threshold is chosen in step D4, the threshold being based on the mark, the small number of triples associated with the vehicle, and the key pool size. If the mark is less than the threshold (D5=YES), the revoked triple is replaced in step D6, and the process is terminated.

If the vehicle is not associated with a revoked triple (D2=NO), or if the mark is greater than the threshold (D5=NO), then the process terminates.

Analysis of the Proposed Detection Schemes

We are currently analyzing the performance of the proposed detection schemes in detail: for various numbers of attackers, attack modalities and number of vehicles monitored. Our preliminary results show that:

- As the black marks for all vehicles grow, a higher RT will be required to achieve the same target performance criteria.
- With more attackers, the average time (number of black marks) until detection increases.
- With fewer vehicles monitored, the detection threshold and average time to detection decrease, suggesting that geographical localization techniques should help increase scalability.

This last phenomenon also provides the following insight: separating the black-marked certificates in 'families' containing a subset of attackers can increase the effectiveness and speed in which the proposed method detects attackers, hence increasing its scalability and performance. Such separation can be done by spatial or temporal separation of black-marked certificates. Keeping the families of black marks smaller helps keep the detection thresholds lower, and therefore enables faster detection.

Under large scale attacks (a large number of simultaneous attackers), temporal separation may become difficult, as subsequent black-marked certificates are likely to correspond to different attackers. Spatial separation may still be feasible.

Geographic Attack Isolation

This embodiment provides a solution to the "one affects many" problem, by which an attacker affects all other vehicles that share the certificate used during the attack, in that all are considered candidate attackers and have to go through a re-keying procedure. According to this solution, a number of geographic areas are defined and the search for an attacker is concentrated in the geographic area where certificate misuse was first detected. The search slowly expands in coverage until the attacker is identified, assuming that the effect due to a vehicle driving across different areas is negligible. In several practical scenarios, this method turns the "one affects many" effect into a "one affects none" effect.

The embodiment can be implemented as a refinement to a basic combinatorial scheme. The goal of this embodiment is to create a novel technique that solves the following "one affects many" problem. Assume that an attacker uses one anonymous key and its associated certificate to send malicious messages. Upon discovery of malicious activity in these messages, this certificate is revoked and added to the certificate revocation list. As a consequence, since several other vehicles share the same certificate, these vehicles are affected in that they are considered candidate attackers and have to go through a re-keying procedure. By observing that attackers implicitly reveal their location in their messages and that a very large number of vehicles sharing the attacker's keys will be in quite different locations, it is possible to note that these latter vehicles were not involved in the attacks and thus will be unaffected, and will not be required to re-key. In several practical scenarios, our method turns the "one affects many" effect into a "one affects none" effect.

All the key update strategies previously discussed require a procedure that performs an investigation of which vehicle, among several candidates, was responsible for one or more maliciously generated messages. Because this procedure is expensive in terms of various resources, it is clearly desirable to minimize the number of innocent vehicles that are required to go through the investigation. This is crucial to avoid the following subtle denial of service attack: a malicious attacker continuously corrupts multiple vehicles, forcing a much larger number of vehicles to generate key update requests to the Assigning CA, which can potentially be flooded with such requests.

For instance, according to the basic combinatorial scheme as described above, for every single maliciously generated message m from a vehicle (associated to a given key k), there are an average number of Vn/N vehicles that are going to be subject to the above investigation procedure. Moreover, the version of the basic combinatorial scheme enhanced with probabilistic key replacement, which is essential to detect repeatedly malicious vehicles, further increases the number of vehicles subject to investigation by a (small) multiplicative factor c. As for practical values of parameters V, n, N, and c, numbers can be quite high. The following novel technique based on location-based CRLs potentially decreases, by a very large number, the number of affected vehicles.

The problem being considered appears strongly connected to the anonymity problem in the design of a certificate scheme, as we now explain. If we aim for a scheme that satisfies desirable anonymity properties, then the number of potential senders of any given message is large, and thus the number of vehicles thought to be candidate attackers because of a given malicious message may also be large. Conversely, if we look for ways to reduce the number of vehicles subject to an investigation, we will most likely end up with methods that reduce the anonymity of vehicles with respect to a given message. Thus, we need to look for approaches that bear some minimal loss of anonymity, or minimize the impact of this loss. Indeed, the refinement that we suggest has some intrinsic loss of anonymity as would any certificate scheme where vehicles send messages to location-dependent RSEs, thus constantly revealing their approximate geographic position.

Consider a maliciously generated message from a vehicle in geographic position (x, y) and associated with a key k. Because of the scheme's design, we know that there will be an average number of Vn/N vehicles that were distributed key k and are thus going to be declared candidate attackers in reference to this malicious message. However, the number of such vehicles having geographic position close to (x, y) is expected to be much smaller, and it appears useless to require vehicles with geographic position "far enough" from (x, y) to be declared candidate attackers.

Specifically, we can think of dividing the entire country, or whichever is the entire geographic area of interest, into a number (e.g., 100) of relatively large geographic areas, and only consider candidate attackers in the same geographic area where the attack was observed Here, the number of areas and their relative sizes are chosen so that, at any given time, the number of vehicles changing areas is of a much lower order with respect to the number of vehicles that remain in the same area. Thus, the basic idea is that one only needs to investigate the vehicles that request their key k to be updated while they are in the same geographic area as where the attack was observed. This is expected to significantly reduce the number of vehicles involved in this procedure and does not contribute any loss of privacy because the remaining vehicles are not candidate originators of the maliciously generated message had already been derived by the knowledge of the location of the RSE that received this message.

We now give more details on how this technique modifies the malicious attacker linked-key test described above, during the attacker elimination stage. We call the resulting test a geography-dependent linked-key test.

Malicious Attacker Discovery

As before, we assume that malicious activity from a vehicle comes in the form of one or many messages, each signed using one particular key pair. Further, assume that this malicious activity is efficiently detectable; that is, given a particular message sent by a vehicle, there is an efficient procedure that establishes whether it contains malicious activity.

First, for any triple that is associated with a message containing malicious activity, a list of candidate attackers, which contains the list of vehicles that were distributed this triple, is recorded. To reduce this list, we remove from the list all vehicles that have updated this revoked triple while talking to an RSE in a geographic area that is different from the geographic area that recorded malicious activity if such activity was very recently discovered, or sufficiently distant from the area that recorded the message with malicious activity if such activity was not recently discovered (i.e., if the area is unreachable by a vehicle in the amount of time (time distance) from the time when the malicious activity was first recorded).

At any time, if there is a triple k having a list with a single vehicle in it, then we declare this vehicle the only candidate for malicious activity with triple k. For all remaining malicious-activity triples, we consider all lists associated with them and count the occurrences of the vehicle identities in them. That is, for each vehicle v, and at any time, we define ml(v) as equal to the number of lists which vehicle v belongs to at this time. Here, the number ml(v) denotes the "malicious level" of this particular vehicle v. Three cases can be distinguished.

If there is one vehicle v such that ml(v)>2n, we declare vehicle v to be a "strong candidate for repeated malicious activity".

If there is one vehicle v such that n<=ml(v)<2n, we declare vehicle v to be a "candidate for repeated malicious activity".

If there is one vehicle v such that 2<ml(v)<n, we declare vehicle v to be a "weak candidate for repeated malicious activity".

The threshold parameter above, currently set equal to 2n, may have to be changed according to varying concrete settings of parameters n, N, V.

Figure 6:
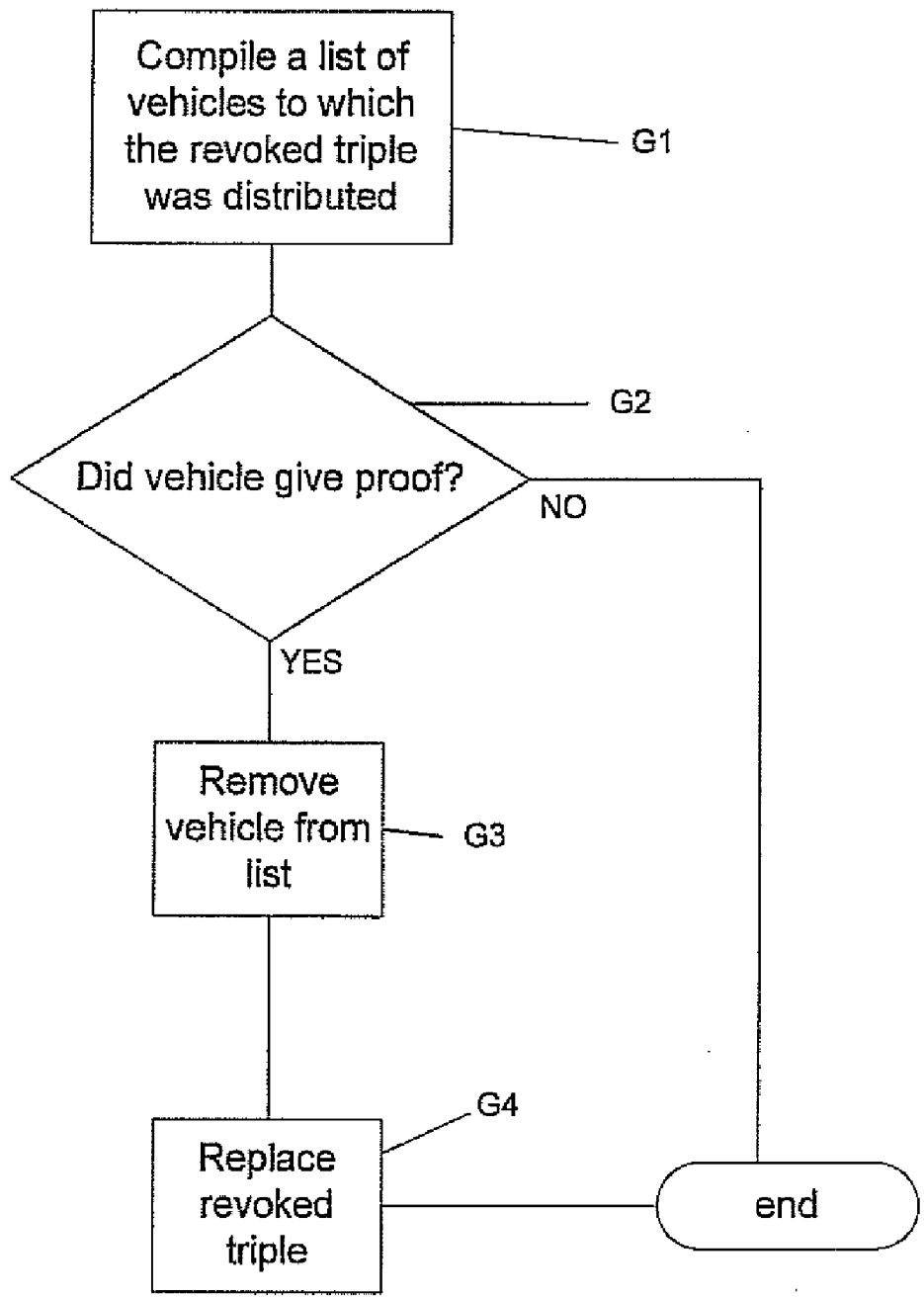
FIG. 6 is a flowchart of a fourth embodiment.

FIG. 6 is a flowchart illustrating geographic attack isolation. Initially, basic combinatorial scheme processes are performed as described above. In step G1, a list of vehicles to which the revoked triple was distributed is compiled. In step G2, each vehicle on the list of vehicles is checked. If a vehicle has given proof of being in a geographically different position from an RSE that recorded the revoked triple (G2=YES), the vehicle is removed from the list in step G3, and its revoked triple is replaced in step G4. Then, the process is terminated.

If the vehicle has not given proof (G2=NO), the process is terminated.

Analysis of the Geography-Dependent Linked-Key Test

The geographic attack isolation technique does not affect anonymity or unlinkability properties of the basic combinatorial scheme. We now analyze the improved attacker elimination properties.

We start by analyzing the case of a single malicious vehicle and then move on to the case of multiple simultaneous malicious vehicles.

Case 1—Single Malicious Vehicle: More formally, assume that one particular vehicle uses one of its anonymous triples k for some malicious activity that is detected by an RSE. As a consequence, the triple k as well as additional triples k(1), . . . k(c) are revoked. At this point, it is hard to detect which vehicle generated the malicious message as several vehicles were assigned triple k and thus any one of them could have potentially acted maliciously.

However, unlike in the basic combinatorial scheme, not all vehicles that previously shared triple k receive the same new triple k' upon completion of their update request, as each of them may receive any of the additional new triples k'(i) with some probability. Now, if the previously malicious vehicle continues its malicious activity using the new triple k', thus forcing this new triple to be revoked again, the set S(k) of vehicles that share k' with the malicious vehicle is largely different from the set S(k') of vehicles that previously shared k with the malicious vehicle. As a result, the malicious vehicle can be identified to be one of the vehicles in the intersection of the two sets S(k), S(k').

Moreover, this intersection effect will continue indefinitely in the presence of repeated malicious activity, until a single vehicle is detected to be the one that had acted maliciously. More formally, we note that due to the random rekeying assignment procedure for triple k' and for the c triples k'(1), . . . k'(c) additionally revoked together with triple k, the set of vehicles that are potential originators of the repeated malicious activity decreases by a multiplicative factor equal to 1/(c+1) after every round of triple updates from the CA. Here, by a "round of triple updates" we mean the worst-case assumption that the CA updates all vehicles that share the triple k used during the malicious activity. Since the original set of potentially malicious vehicles had average size equal to Vn/N, the malicious vehicle will be detected within a number of rounds of triple updates equal on average to log (Vn/N)/log (c+1) (logarithms are in base 2).

Table 2 evaluates the expected number of rounds of triple updates required to discover the malicious vehicle that keeps its malicious activity going after every triple update, under the assumption that the malicious vehicle waits for all triple updates in a round to be performed by the CA before continuing its malicious activity. Here, we consider the typical values of V=200,000,000, n=6, and a few reasonable instantiations of parameters N and c.

TABLE 2

Expected Number of Key Update Rounds to Identify a Malicious Vehicle

| Pool Size (N) | c = 1 | c = 3 | c = 7 | c = 15 |
|---|---|---|---|---|
| 10000 | 16.8 | 8.4 | 5.6 | 4.2 |
| 5000 | 17.8 | 8.9 | 5.9 | 4.4 |
| 2500 | 18.8 | 9.4 | 6.2 | 4.7 |

If we drop the worst-case assumption that the malicious vehicle waits for all triple updates in a round to be performed by the CA before continuing its malicious activity, and we assume that the malicious vehicle is lucky enough to wait for at most a fraction q (e.g., q=¼) of all key updates to be performed, then all entries in the above table should be multiplied by q, thus significantly reducing these numbers to very small constants in most practical scenarios. By generalizing this idea, we can define a key-update rate, denoted as u, for each vehicle, and use in our analysis the crucial observation that the value u is, for most non-attacking vehicles, significantly smaller than for attacking vehicles.

Furthermore, if we consider that the geographical isolation technique significantly reduces the size of the list of candidate attackers for any key associated with malicious activity, then we obtain that the malicious vehicle will be detected within a number of rounds of key updates equal on average to log (L)/log (c+1) (logarithms are in base 2), where L is the length of this original list, as reduced due to geographic isolation.

The details of how the actual identification of a vehicle detected to be malicious is carried out depend on the details of the initialization of identifying and anonymous keys and certificates in the vehicle initialization and presale phase. Two main variants for this key initialization procedure are presented. The first variant considers the case of an Authorizing CA that certifies each identifying key and issues a set of anonymous keys to any specific vehicle. In this case, the Authorizing CA knows which keys have been assigned to which identified vehicle. Thus the Intrusion Detection System (IDS) will only need to communicate to the Authorizing CAs the sequence of keys currently linked with malicious activity, and the Authorizing CA will answer with the (list of) vehicles that were given a large enough number of those keys The second variant considers the case of a joint generation of anonymous keys from the Authorizing CA (that knows the identity of the vehicle but not which anonymous keys have been assigned to it) and the Assigning CA (that knows which anonymous keys have been assigned to a vehicle but not its identity). In this case, the IDS system will need the Assigning CA to communicate the sequence of keys currently linked with malicious activity to the Authorizing CA that again will answer with the (list of) vehicles that were given a large enough number of those keys. Note that the Assigning CA is trusted to provide a correct sequence of keys, which is without loss of generality as the Assigning CA is trusted by the Authorizing CA to correctly perform a number of other functions as well.

Case 2—Multiple Malicious Vehicles: The above analysis assumed the existence of a single vehicle that sends maliciously generated messages. A much more realistic scenario might involve multiple vehicles that at any given time are concurrently sending maliciously computed messages, potentially from different geographic locations. In fact, the worst case scenario is a large-scale attack where every triple in the pool is used by one or more vehicles to send malicious messages. As we now describe in more detail, by making a number of reasonable assumptions on the distribution of vehicles and on the distribution of attackers, the analysis of this apparently more involved scenario follows from a careful extension of the previous analysis for a single attacking vehicle.

In addition to the already defined parameters N, n, b, c, L, t, V, u, we consider the number of RSE's or geographic areas g in the country. Each geographic area can have lower or higher vehicle density, with potentially varying values according to the time of the day or the day of the year. We will mostly focus on two scenarios, one of low vehicle density, for which we use parameter ld, and one of high vehicle density, for which we use parameter hd, where we expect that ld<<V/g and hd>>V/g. We will use parameter a to denote the number of attacks or attackers, and we will consider a>1, or even a>N, modeling large-scale attacks.

We start by analyzing the success in attacker elimination under many interesting scenarios, according to different assumptions regarding the following factors: the higher or lower number of malicious messages sent in any given attack; the amount of time elapsed between any two malicious messages sent with respect to any given attack; the geographic areas where each attacker is located; the low or high vehicle density in these geographic areas where the attack is located.

Scenario (a): In this scenario, we make the following assumptions: attackers can send only a single message to perform their attack; the geographic areas where each attacker is located are independently and uniformly distributed in the country and have low vehicle density.

In this case, at the end of the geographical isolation technique, vehicles that, at attack time, were outside of any of the geographical areas where an attack happened have already proved their innocence by giving a different position as proof of geographical position. However, for each geographical area where an attack happened, there is at least one revoked triple and one list of L candidate attackers that have the same triple as involved in the attack, and were in the same geographical area at attack time. Given parameters n, N, ld, the expected value of L−1 for each specific attack is $(ld-1)1-(1-1/N)^n)$, which can be approximated as $(ld*n)/N$, which can be considered smaller than 20 nV/gN if we assume that ld<20V/g. Note that we can choose n, N so that 20 nV/gN is much smaller than 1. We would like to compute the expected value of the sum of L(i)−1 for all i, where L(i) is the length of the list of the candidate attackers associated with the i-th attack in the same geographic area. This can be computed by multiplying 20 nV/gN times the expected number of attackers in the same geographic area. This latter number can be analyzed by a variation of the classical "balls into bins" problem, since we are assuming that the geographic areas where each attacker is located are independently and uniformly distributed in the country.

From this analysis, we obtain that with probability at least $(1-1/g)^{10}$, the number of attackers is at most $6a/g+10 \log g$. Finally, we note that 20 nV/gN (6ag+10 log g) is still less than one (1) for suitable values of n, N, and practical values of g and even for very large values of a, including a smaller than g times a not very large constant. We note that the choice of n and N may be constrained by considerations of vehicle privacy. Also, the pool size, N, is not easily adjustable once operation of the system has begun.

The above analysis implies that in this scenario the list of candidate attackers, on average, contains the attacker alone. The analysis can be extended to show that this holds with high probability.

Scenario (b): In this scenario, we start by making the same assumptions as in scenario (a), and we only make the following modification: instead of assuming the geographic areas where each attacker is located are independently and uniformly distributed in the country, we assume that the attackers are independently and uniformly chosen among all vehicles.

With this different assumption, areas with high vehicle density might have larger candidate attacker lists. As in scenario (a), we still obtain that the expected value of L−1 for each specific attack can be approximated as (ld*n)/N, which can be considered smaller than 20 nV/gN (and, thus can be made much smaller than 1) if we assume that ld<20N/g However, the computation of the expected number of attackers in the same geographic area is different, and can be analyzed by a variation of the above analysis, using a "balls into bins" problem with non-uniform placement distribution. From this analysis we obtain that with probability at least $(1-1/g)^{10}$, the number of attackers is at most 6ld*a/V+10 log g. Finally, we note that 20 nV/gN (6ld*a/V+10 log g) is still less than 1, for suitable values of n, N, and practical values of g and even for very large values of a, including a smaller than g times a not very large constant. We note that the values of n, N may be constrained by target privacy levels and that N may be difficult to adjust while the system is operating.

The above analysis implies that even in this scenario, the list of candidate attackers, on average, contains the attacker alone. Also, this analysis can be extended to show that this holds with high probability.

Scenario (c): In this scenario, we assume that attackers perform each of their attacks by sending at least 2n malicious certificates; these messages are sent at not long time intervals from each other; the geographic areas where each attacker is located are not necessarily independent and uniformly distributed in the country and have high vehicle density.

In this case, at the end of the geographical isolation technique, vehicles that were outside of any of the geographical areas where an attack happened at attack time have already been ruled out as candidate attackers. This assumes that the fraction of vehicles changing geographic areas to all vehicles in the area is negligible. Since we assume that an attack contains at least 2n malicious messages and that these messages are sent at short time distance from each other, we can isolate a single geographic area within which the attack happened. This may be a single area covered by an RSE, or even the union of very few such areas. Now, for each geographical area where an attack happened, there are at least 2n revoked triples (since the attack takes at least 2n messages) for each of the a attacks. Each of the a attackers can choose how to allocate the 2n attack triples among the n triples that were originally assigned to this attacker and up to 2n new keys obtained after rekeying operations, the goal being that of maximizing the number of honest vehicles that share 2n triples with any among the a attackers. While it is easy to see that with high probability the sequence of 2n triples uniquely identifies its associated attacker, it could happen that a such sequences might be associated with more than a vehicles, in which case an honest vehicle could be considered as a candidate attacker.

Now, consider an honest vehicle in the same geographical area. We compute an upper bound for the probability that this vehicle happens to be associated with at least 2n among the attacking triples in the same geographical area, as follows: this event happens if (a) the n triples originally distributed to the honest vehicle happen to be shared by the attacking vehicles (before or after 2n rekeying operations), and if the n triples distributed to the honest vehicle after rekeying operations are shared by the attacking vehicles either (b) because of the probabilistic rekeying strategy used or (c) because they just happen to be some of the other keys distributed to the attacking vehicles.

We note that the probability that (a) happens is at most $(2an/N)^n$; the probability that (b) happens is at most $(1/(c+1))^n$, because of the probabilistic rekeying strategy, and the probability that (c) happens is at most $(2an/N)^n$. Overall, the probability that a given honest vehicle is declared a strong candidate for repeated malicious activity is $(2an/(c+1)N)^n + (2an/N)^{2n}$. Since we consider a high-density vehicle area, in the same geographic area there are about hd vehicles, and the probability that there exists at least one honest vehicle in this area that is declared a strong candidate for repeated malicious activity is $hd((2an/(c+1)N)^n + (2an/N)^{2n})$. We note that for any hd, a, there are suitable values of c, n, N, such that this quantity is very small. As before, we note that the values of n, N may also be constrained by target privacy levels.

If we further consider the idea from the discussion of Table 1 (above), we can use the observation that the key-update rate u is, for most non-attacking vehicles, significantly smaller than for attacking vehicles. More specifically, by assuming that each re-keying done by an attacker is performed by at most a fraction q (e.g., q=¼) of vehicles that share the same revoked key, and that such events are independent across each re-keying, we obtain that the expected number of honest vehicles in the same geographic area that are declared a strong candidate for repeated malicious activity is equal to $hd((2aqn/(c+1)N)^n + (2aqn)^{2n})$.

Additional Scenarios: The most important scenario not yet considered occurs when attackers perform each of their attacks by sending a single or very few malicious certificates, and the geographic areas hosting each attacker are not necessarily independent and uniformly distributed in the country, and have high vehicle density.

Preliminary ideas are being considered to solve this difficult problem, based on artificially and gradually slowing down the rate of re-keying of honest vehicles, up to even allowing no re-keying at all in the emergency event of large-scale attacks. The negative impact of attackers that send a single or very few malicious certificates needs to be further studied and understood, also in combination with an appropriate choice for the anonymous key and certificate selection and rotation strategies.

Proof of Geographic Position

This embodiment provides a more refined solution to the mentioned "one affects many" problem. Each vehicle is allowed to prove its innocence by proving its geographic position at the time that the certificate misuse was detected. A proof of geographic position consists of a time-dependent and vehicle-specific signature release by an RSE to a vehicle.

The embodiment can be implemented as a refinement to a basic combinatorial scheme. The goal of this embodiment is to design a novel technique that gives a more accurate solution to the "one affects many" problem. The above described geographic attack isolation embodiment provides a technique based on geographic isolation of the attackers, specifically by observing that attackers implicitly reveal their location in their messages and that a very large number of vehicles sharing the attackers' keys will be in quite different locations. The latter vehicles can easily be recognized as not involved in the attacks and will then be unaffected. Effectively, the geographic embodiment described above considers large geographic areas and discards as negligible the impact from vehicles traveling among areas.

The formal analysis illustrates that in several practical scenarios, we obtain a "one affects none" effect. This principle is further refined in the following embodiment by a novel technique called proof of geographic locations, by which we can obtain a very similar effect even in the presence of a very large and very mobile number of attackers in any small geographic area.

As discussed, all previous key replacement strategies require a procedure that performs an investigation of which vehicle, among several candidates, was responsible for one or more maliciously generated messages. We now enhance these procedures to require each candidate vehicle to prove its innocence, for example, by showing appropriate proofs that clearly dissociate the candidate vehicle's communication traffic or position with those of the malicious vehicle's communication traffic. As illustrated in detail below, this procedure may be expensive in terms of various resources, including computation time, and thus it is clearly desirable to minimize the number of innocent vehicles that are required to be subject to it.

The motivation for such a technique is as follows. Consider a maliciously generated message from a vehicle in geographic position (x, y) and associated with a key k. Because of the scheme's design, we know that there will be an average number of Vn/N vehicles that were distributed key k and are thus going to be subject to an investigation procedure. As the number of such vehicles having geographic position close to (x, y) is expected to be much smaller, it appears useless to require vehicles which had geographic position "far enough" from (x, y) at attack time to go through the investigation procedure.

Specifically, by considering vehicle mobility, we could think of maintaining a "candidate geographic area" visualized, for simplicity, as a circle with center (x, y) and radius increasing with time. Then, the basic idea would be that the CA only needs to investigate the vehicles that request their key k to be updated while they are in the candidate geographic area at that time, where the area is updated in accordance with time by taking into account possible movements from the malicious vehicle. This technique would seem to significantly reduce the number of vehicles involved in the investigative procedure and does not contribute any loss of privacy because the remaining vehicles that are not candidate originators of the maliciously generated message have already been derived by the knowledge of the location of the RSE that received this malicious message.

However, there is another potential reason why this technique may not reduce the number of vehicles that would be subject to the investigation procedure. Some vehicles may remain unused throughout the period in which the candidate geographic area expands, until this area t eventually includes even vehicles that are very far away from the actual site of malicious activity.

We thus prefer to use a technique that allows a vehicle to prove its position and status at any time, upon request. Specifically, instead of considering all vehicles that were distributed a particular key and certificate as candidate attackers, we would only consider those that were distributed that particular key and that cannot prove that at the attack time they were in a different geographical position. Here, a vehicle periodically requests an RSE for a proof of position, i.e., a time-stamped signature of a vehicle's encryption of some identifying information. Furthermore, by requiring a similar procedure whenever the vehicle is turned ON or OFF, the vehicle can also provide, upon request, proof of vehicle inactivity during a specific time interval.

We now give more details on how to perform this procedure during the anonymous key use stage, and the attacker elimination stage.

Anonymous Key Use Stage

Recall that at any point, every vehicle has n triples, each of them containing a private key, a public key and a certificate, each triple either being not revoked yet or having update requests pending.

At the end of every time interval of a predefined length t, every vehicle asks the listening RSE for a "time-specific" and "vehicle-specific" "proof of position"; that is, a certificate that provides assurance that the asking vehicle is in the geographical areas covered by this RSE. A protocol for this type of proof of position can be realized by combining well-known cryptographic primitives. As an example, the request could contain a commitment to an encryption, using the vehicle's identifying key of a random nonce, and the nonce itself; the RSE's answer could be a time-stamped signature, using the RSE's public key, of the vehicle's request.

Attacker Elimination Stage

A proof of position for this vehicle consists of the vehicle's request, the RSE's answer, the de-commitment key associated with the commitment in the request, the vehicle's identifying public key and the randomness associated with the encryption calculated in the vehicle's request.

We note that variants of this technique are possible. For instance, the vehicle could send an encryption of these values that can be decrypted only by the Authorizing CA that can later refer the content of the encryption to the Assigning CA without releasing the vehicle's identity.

Figure 7:
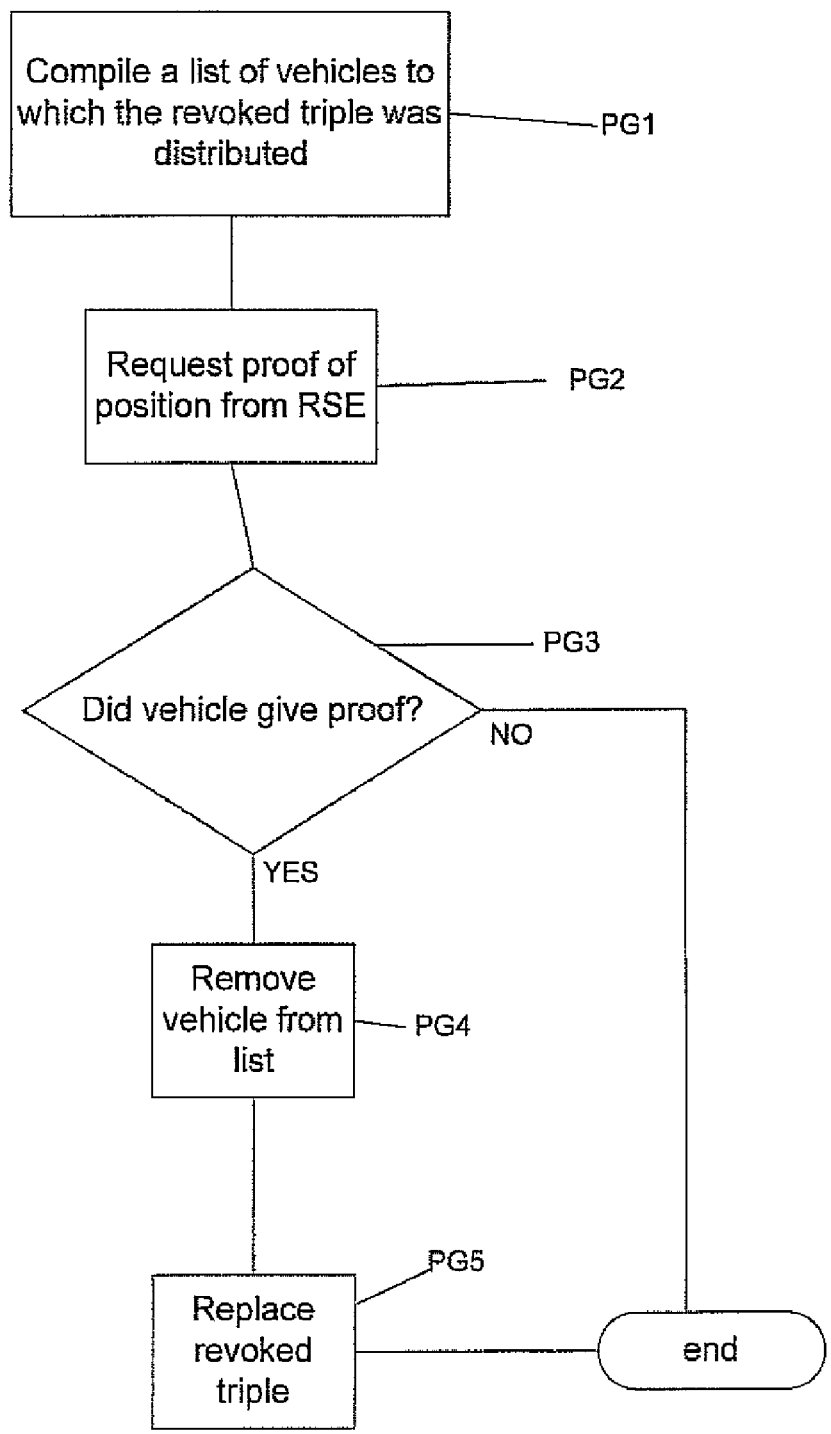
FIG. 7 is a flowchart of a fifth embodiment.

FIG. 7 is a flowchart illustrating proof of geographic position. Initially, basic combinatorial scheme processes are performed as described above. In step PG1, a list of vehicles to which the revoked triple was distributed is compiled. In step PG2, for each vehicle on the list of vehicles, proof of position is requested from an RSE. The proof of position is checked in step PG3 and, if the proof of position illustrates said vehicle is in a geographically different position from an RSE that recorded the revoked triple (PG3=YES), the vehicle is removed from the list in step PG4. In step PG5, the revoked triple is replaced.

If the proof of position does not illustrate a geographically different position (PG3=NO), then the process is terminated.

While the present invention has been described in particular embodiments, it should be appreciated that the present invention should not be construed as limited by such embodiments, but rather construed according to the claims below.

What is claimed is:

1. A method for management of cryptographic keys and certificates for a plurality of vehicles, said method comprising steps of:
   a certificate authority device for:
   generating a pool of triples using a key-generation algorithm, said pool having key-pool-size number of triples;
   distributing to and associating with each vehicle of said plurality of vehicles a small number of triples chosen randomly from said pool of triples;
   revoking a triple of said chosen triples when said triple is detected as used in malicious activity; and
   for each vehicle associated with said revoked triple, determining whether to replace said revoked triple using one or more refinements;
wherein a first of said refinements comprises the steps of:
   for each vehicle the certificate authority device:

creating an anonymous identifier and maintaining a rekeying record associated with said anonymous identifier;

incrementing a rekey counter in said rekeying record for said anonymous identifier according to a number of keys said vehicle requests over a time period; and decrementing the rekey counter for each anonymous identifier by an amount if no rekey requests occurred during a previous time period, unless said rekey counter equals one of a rekey threshold and zero, wherein when the rekey counter is less than or equal to the rekey threshold for said vehicle, replacing said one revoked triple for said vehicle.

2. The method according to claim 1, wherein a second of said refinements comprises the steps of:

revoking number-c triples that are randomly chosen among the triples of the pool that are not currently revoked, where said number-c is a small integer;

selecting number-c1 new triples randomly and independently generated using the key-generation algorithm, where said number-c1 is said number-c plus one;

designating the number-c1 new triples to replace the revoked number-c triples; and when a vehicle requests an updated triple, choosing said updated triple among the number-c1 new triples and sending said chosen updated triple to the requesting vehicle.

3. The method according to claim 2, further comprising the steps of for each revoked triple, compiling a list of vehicles to which the revoked triple was distributed; and removing from the list all vehicles that have updated the revoked triple and have given proof of being in a geographically different position from a RoadSide Equipment (RSE) that recorded the revoked triple.

4. The method according to claim 1, wherein a third of said refinements comprises the steps of for each vehicle the certificate authority device:

creating an anonymous identifier and maintaining a rekeying record associated with said anonymous identifier;

if said vehicle is associated with said revoked triple, adding a mark against said vehicle;

choosing a threshold based on said mark, the small number of triples associated with said vehicle, and the key-pool-size; and if said mark is less than said threshold, replacing said revoked triple.

5. The method according to claim 4, said threshold further based on at least one of a time period and a geographic location.

6. The method according to claim 1, wherein a fourth of said refinements comprises the steps of:

compiling a list of vehicles to which the revoked triple was distributed; and for each vehicle on said list of vehicles, if said vehicle has given proof of being in a geographically different position from a RoadSide Equipment (RSE) that recorded the revoked triple, removing said vehicle from the list, and replacing said revoked triple.

7. The method according to claim 1, wherein a fifth of said refinements comprises the steps of:

compiling a list of vehicles to which the revoked triple was distributed;

for each vehicle on said list of vehicles, requesting a proof of position from a RoadSide Equipment (RSE), and if said proof of position illustrates said vehicle is in a geographically different position from an RSE that recorded the revoked triple, removing said vehicle from the list, and replacing said revoked triple.

8. The method according to claim 7, wherein said proof of position comprises said vehicle request, an answer from said RoadSide Equipment (RSE), a de-commitment key associated with a commitment in said vehicle request, a public key associate with said vehicle, and a randomness associated with an encryption calculated in said vehicle request.

9. A non-transitory computer readable medium having computer readable program code for operating on a computer for management of cryptographic keys and certificates for a plurality of vehicles, comprising:

controlling a certificate authority for:

generating a pool of triples using a key-generation algorithm, said pool having key-pool-size number of triples;

distributing to and associating with each vehicle of said plurality of vehicles a small number of triples chosen randomly from said pool of triples;

revoking a triple of said chosen triples when said triple is detected as used in malicious activity; and for each vehicle associated with said revoked triple, determining whether to replace said revoked triple using one or more refinements;

wherein a first of said refinements comprises:

for each vehicle:

creating an anonymous identifier and maintaining a rekeying record associated with said anonymous identifier;

incrementing a rekey counter in said rekeying record for said anonymous identifier according to a number of keys said vehicle requests over a time period; and decrementing the rekey counter for each anonymous identifier by an amount if no rekey requests occurred during a previous time period, unless said rekey counter equals one of a rekey threshold and zero, wherein when the rekey counter is less than or equal to the rekev threshold for said vehicle, replacing said one revoked triple for said vehicle.

10. The computer readable program code according to claim 9, wherein a second of said refinements comprises:

revoking number-c triples that are randomly chosen among the triples of the pool that are not currently revoked, where said number-c is a small integer;

selecting number-c1 new triples randomly and independently generated using the key-generation algorithm, where said number-c1 is said number-c plus one;

designating the number-c1 new triples to replace the revoked number-c triples; and when a vehicle requests an updated triple, choosing said updated triple among the number-c1 new triples and sending said chosen updated triple to the requesting vehicle.

11. The computer readable program code according to claim 10, further comprising:

for each revoked triple, compiling a list of vehicles to which the revoked triple was distributed; and removing from the list all vehicles that have updated the revoked triple and have given proof of being in a geographically different position from a RoadSide Equipment (RSE) that recorded the revoked triple.

12. The computer readable program code according to claim 9, wherein a third of said refinements comprises:

for each vehicle:

creating an anonymous identifier and maintaining a rekeying record associated with said anonymous identifier;

if said vehicle is associated with said revoked triple, adding a mark against said vehicle;

choosing a threshold based on said mark, the small number of triples associated with said vehicle, and the key-pool-size; and if said mark is less than said threshold, replacing said revoked triple.

13. The computer readable program code according to claim 12, said threshold further based on at least one of a time period and a geographic location.

14. The computer readable program code according to claim 9, wherein a fourth of said refinements comprises:

compiling a list of vehicles to which the revoked triple was distributed; and for each vehicle on said list of vehicles, if said vehicle has given proof of being in a geographically different position from a RoadSide Equipment (RSE) that recorded the revoked triple, removing said vehicle from the list, and replacing said revoked triple.

15. The computer readable program code according to claim 9, wherein a fifth of said refinements comprises:

compiling a list of vehicles to which the revoked triple was distributed;

for each vehicle on said list of vehicles, requesting a proof of position from a RoadSide Equipment (RSE), and if said proof of position illustrates said vehicle is in a geographically different position from an RSE that recorded the revoked triple, removing said vehicle from the list, and replacing said revoked triple.

16. The computer readable program code according to claim 15, wherein said proof of position comprises said vehicle request, an answer from said RoadSide Equipment (RSE), a de-commitment key associated with a commitment in said vehicle request, a public key associate with said vehicle, and a randomness associated with an encryption calculated in said vehicle request.

* * * * *